United States Patent [19]

Brunell

[11] Patent Number: 4,854,063

[45] Date of Patent: Aug. 8, 1989

[54] STREET IDENTIFICATION SIGN ASSEMBLY

[76] Inventor: Alejandro Brunell, Chapultepec 1836 Ote., Monterrey, Nuevo Leon, Mexico

[21] Appl. No.: 136,702

[22] Filed: Dec. 22, 1987

[51] Int. Cl.$^4$ .............................................. G09F 15/00
[52] U.S. Cl. ........................................ 40/607; 40/606
[58] Field of Search ................................. 40/606, 607

[56] References Cited

U.S. PATENT DOCUMENTS

| | | | |
|---|---|---|---|
| 1,902,511 | 3/1933 | McDaniel | 40/607 |
| 1,918,571 | 7/1933 | Sheras | 40/607 |
| 3,935,655 | 2/1976 | Fritzinger | 40/607 |
| 4,262,438 | 4/1981 | Scherer | 40/607 |
| 4,455,775 | 6/1984 | Fritzinger | 40/607 |
| 4,776,116 | 10/1988 | Shuman | 40/607 |

*Primary Examiner*—Robert Peshock
*Assistant Examiner*—Michael Lynch
*Attorney, Agent, or Firm*—Cahill, Sutton & Thomas

[57] ABSTRACT

A street identification sign assembly which is formed of a suitable synthetic resin for resisting the various damaging abuses to which such structures are subjected, and is of special configuration for deterring theft. The sign assembly includes a special post cap for attachment to the inside of a vertical sign post by mounting hardware that is completely hidden and inaccessible when the sign assembly is fully assembled on the sign post. At least one street identifying sign, and usually two, are mounted on the post cap by special interconnecting structures that are integrally formed on the post cap and on the signs so as to be hidden from view and resist disassembly of an installed street sign assembly.

12 Claims, 2 Drawing Sheets

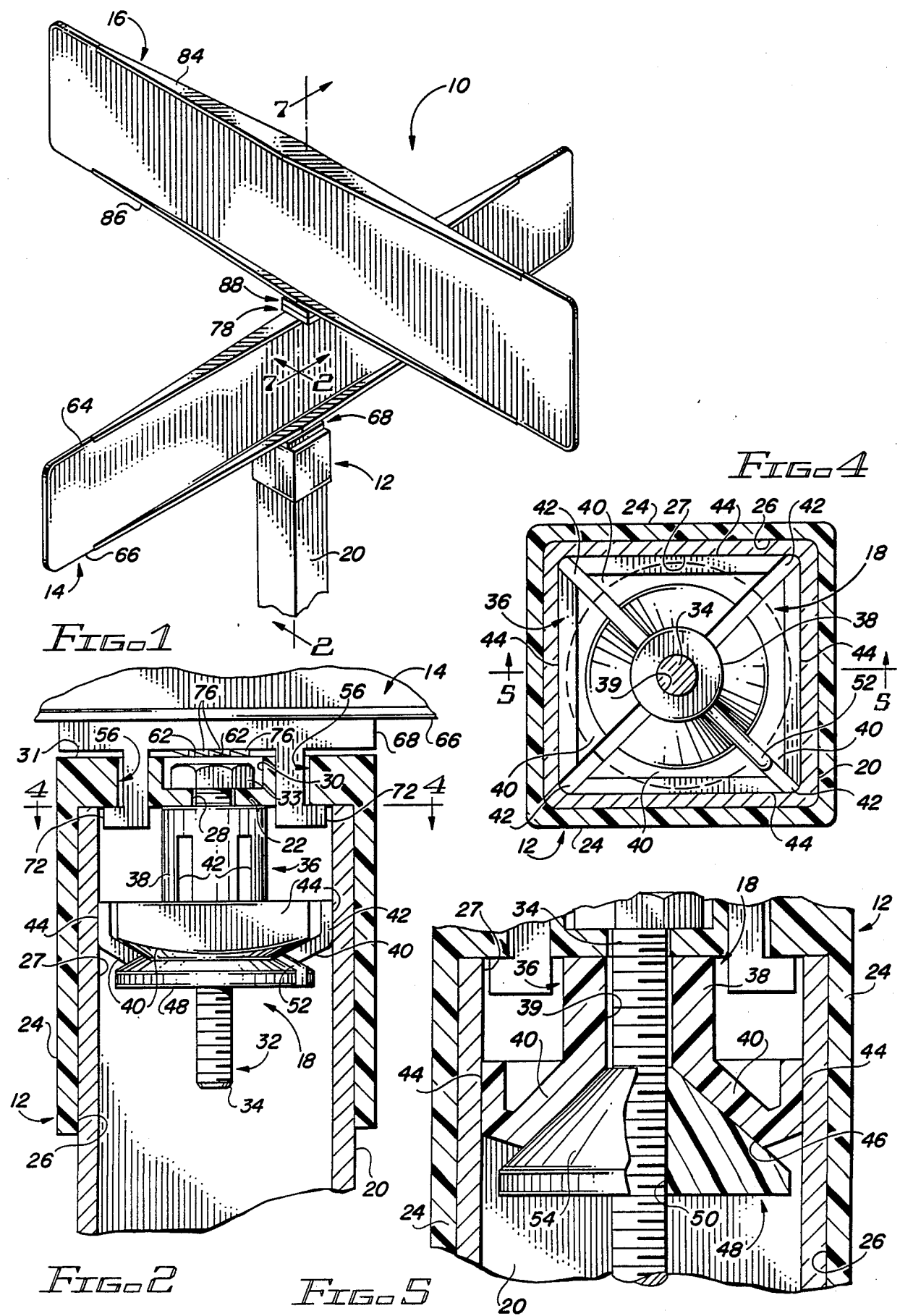

STREET IDENTIFICATION SIGN ASSEMBLY

BACKGROUND OF THE INVENTION

1. Field of the Invention

This invention relates in general to signs and more particularly to street identification sign assemblies of the type mounted on vertical posts.

2. Description of the Prior Art

Street identification signs are subjected to various types of abuse such as the destructive acts of juveniles, intentional vandalism, traffic accidents, weather damage, and the like. In view of this, many attempts have been made to devise street identification signs which resist these abusive forces. Examples of such attempts are disclosed in U.S. Pat. Nos. 3,529,798; 3,750,314; 3,935,655; and 4,262,438. In order to provide street signs which are capable of resisting such abuse, street signs, such as those disclosed in these prior patents, are of very sturdy configuration and are usually provided with strong and heavy cast metal mounting brackets. As a result of this, prior art street signs are relatively complex, heavy and expensive assemblies. However, one of the more serious problems with this is that the various components which are used to make the street signs are assembled to each other and mounted on the vertical posts with screws, bolts and similar fasteners. The use of such fasteners aggravates another problem associated with street signs, i.e. theft. Young people, usually those of high school and college age consider it fashionable to steal such signs and display them in their rooms, and this, of course, is very costly.

Therefore, a need exists for a new and improved street sign assembly of simplified and less costly configuration in comparison to the prior art, and which resists both abuse and theft.

SUMMARY OF THE INVENTION

In accordance with the present invention, a new and improved street identification sign assembly of the type mounted on top of vertical sign posts is disclosed. The street sign assembly is preferably molded or otherwise formed of a suitable synthetic resin and is assembled and mounted atop the sign post so that no mounting hardware or fasteners are visible or accessible. By forming the sign assembly of synthetic resin containing appropriate additives such as ultraviolet inhibitors and the like, very strong low cost sign assemblies can be manufactured which have a high resistance to abusive forces, environmental and weather induced damage and the like. Also, the lack of any visibly apparent assembly means and the inaccessability of fasteners, deters theft in that the manner in which disassembly and removal of the street sign assembly from a sign post can be accomplished is not readily apparent and in fact, such disassembly and removal is very difficult and cannot be accomplished without damaging the sign assembly.

The street sign assembly of the present invention includes a special post cap which defines a downwardly opening bore into which the top of the sign post is axially receivable. A special locking means depends axially from the post cap into the bore of the sign post and the locking means includes a bolt which passes downwardly through the top of the post cap with a spreader nut and wedge mounted on the shank of the bolt. The wedge is of conical configuration and is threadingly carried on the lower end of the shank of the bolt. When the bolt is rotated in the usual manner, the conical wedge will move upwardly into a conical bore formed in the downwardly facing surface of the spreader nut which causes radial spreading of plural arms provided on the nut, into gripping engagement with the inside surface which defines the bore of the sign post.

The head of the bolt of the locking means is located within a central recess provided in the top surface of the post cap, and that same surface is provided with means for mounting a first street identification sign thereon so that the sign covers the head of the bolt to hide it and make it inaccessible. A pair of key-hole shaped openings and saw-tooth ridges are formed on the top surface of the post cap, and a pair of depending L-shaped clips or hooks, and oppositely facing saw-tooth ridges are formed on the downwardly facing surface of a lower mounting pad provided on the first street sign. Mounting of the first sign on the post cap is accomplished by placing the L-shaped clips, or hooks of the mounting pad in the larger ends of the aligned key-hole shaped openings and rotating the street sign to move the L-shaped hooks into the narrower portions of the key-hole shaped openings. When this rotation is accomplished, the L-shaped hooks are in hooked engagement with the post cap and removal of the mounted street sign is prevented by a locking, or jamming interaction of the saw-tooth ridges provided on the post cap and on the bottom pad of the first street sign. The saw-tooth ridges of the sign and the post cap act like a ratchet-pawl arrangement which allows motion in one direction and prevents reverse motion.

The first street sign may be formed with an upper mounting pad which is provided with key-hole shaped openings and saw-tooth ridges in the same manner as the post cap. A second street sign having a lower mounting pad with depending L-shaped clips, or hooks and oppositely facing saw-tooth ridges, may be mounted on the upper mounting pad of the first street sign in exactly the same manner as the first street sign is mounted on the post cap, with the second street sign being disposed in a cruciform attitude with respect to the first street sign.

Accordingly, it is an object of the present invention to provide a new and improved street identification sign assembly which is simple and inexpensive to manufacture and has a high resistance to the various types of abuse to which such assemblies are subjected.

Another object of the present invention is to provide a new and improved street sign assembly which is configured so that the manner in which it is assembled is not visibly apparent and the mounting fasteners are inaccessible to deter theft.

The foregoing and other objects of the present invention as well as the invention itself may be more fully understood from the following description when read in conjunction with the accompanying drawings.

BRIEF DESCRIPTION OF THE DRAWINGS

FIG. 1 is a perspective view of the street identification sign assembly of the present invention.

FIG. 2 is an enlarged fragmentary sectional view taken along the line 2—2 of FIG. 1 and showing the post cap and locking means by which it is mounted on the top end of a sign post.

FIG. 4 is a sectional view taken along the line 4—4 of FIG. 2.

FIG. 5 is an enlarged fragmentary sectional view taken along the line 5—5 of FIG. 4.

DESCRIPTION OF THE PREFERRED EMBODIMENT

Figure 3:
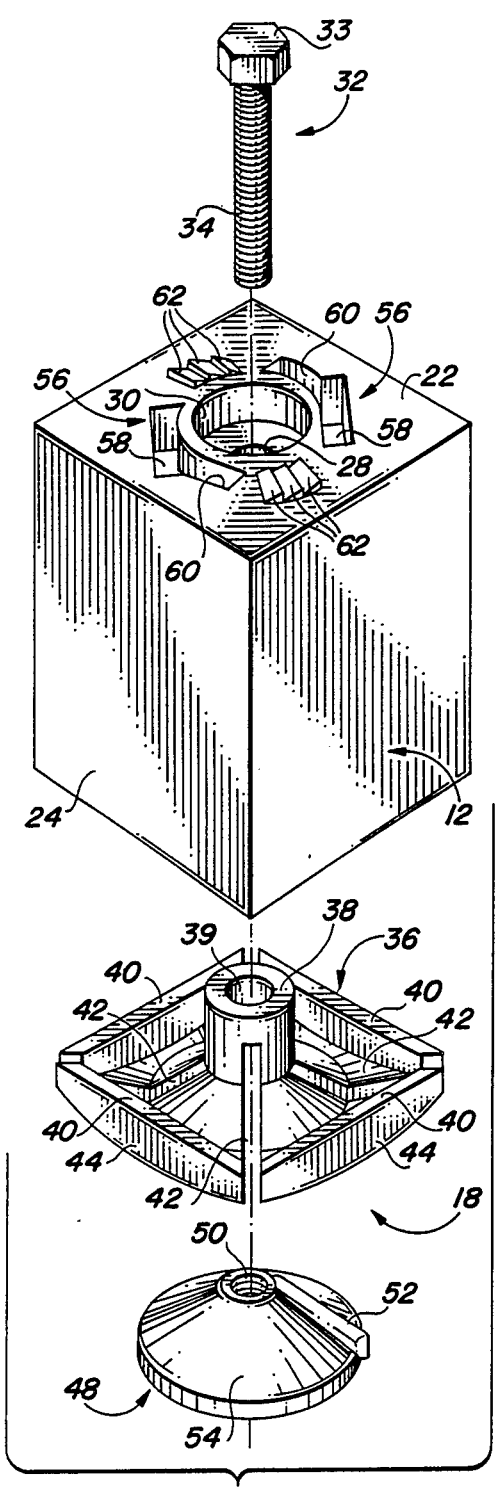
FIG. 3 is an enlarged perspective view showing the post cap and locking means in exploded relationship with each other.

Referring more particularly to the drawings, FIG. 1 shows the street identification sign assembly of the present invention which is indicated in its entirety by the reference numeral 10. As will hereinafter be described in detail, the street identification sign assembly 10 includes the major components of a post cap 12, first, or lower, street sign 14, and a second, or upper, street sign 16 all of which are preferably molded or otherwise formed of a suitable synthetic resin such as polycarbonate. A special locking means 18 is associated with the post cap 12 for attachment to a vertical sign post 20, and the post cap 12, first street sign 14 and the second street sign 16 are of special configuration which allows them to be connected to each other without the use of screws, bolts or other similar fasteners.

The post cap 12 includes a top wall 22 with a skirt 24 depending from the periphery of the top wall 22 so that the top 22 and the skirt 24 cooperatively define a downwardly opening blind bore 26 in which the top end of the sign post 20 is axially receivable as best seen in FIG. 2. As is well known in the art, sign posts of the type used for this purpose are tubular and therefore have an axial bore 27. The illustrated sign post 20 is of square cross-sectional configuration and the post cap 12, and the locking means 18 which will be described below, are appropriately configured to match such a sign post. However, it is to be understood that the post cap 12 and locking means 18 could just as well be configured to match a sign post of circular cross section.

The post cap 12 has an opening 28 formed centrally through its top wall 22 and a counterbore 30 is provided so as to open onto the top surface 31 of the top wall 22. A bolt 32, which forms part of the locking means 18, is disposed to have its head 33 in the counterbore 30 with its threaded shank 34 extending loosely through the central opening 28 of the post cap 12 so as to depend axially into the bore 26 of the post cap 12 and, of course, axially into the bore 27 of the sign post 20 when the sign post is received in the bore of the post cap 12.

A spreader nut 36 of special configuration is mounted. Loosely on the threaded shank 34 of the bolt 32 so as to be freely axially movable thereon. The spreader nut 36 includes a cylindrical boss 38 which defines an axial bore 39 through which the shank 34 of the bolt passes, and a plurality of arms 40 (4 shown in the illustrated embodiment) which extend integrally and outwardly from the lower end of the boss 38. The individual arms 40 are separated from each other by spaces 42 which allow the arms 40 to be deflectingly and independently moved relative to each other in a manner which will become apparent as this description progresses. Each of the arms 40 has an outwardly facing bearing surface 44 formed on its outer end for frictionally gripping the inner surface which defines the bore 27 of the sign post 20 when the arms 20 are deflected radially into bearing engagement with the inner surface of the sign post 20. The spreader nut 36 is configured so that its four arms 40 cooperatively define a downwardly opening conical bore 46 for receiving a conical wedge 48. This conical wedge 48 has an internally threaded axial bore 50 in which the lower end of the shank 34 of the bolt 32 is threadingly mounted. A rib 52 is formed on the conical surface 54 of the wedge 48 with the rib 52 being disposed in one of the spaces 42 of the spreader nut 36 to present rotation of the conical wedge 48 in the conical bore 46 of the spreader nut 36.

When the post cap 12 is mounted atop the sign post 20 and the locking means 18 is disposed in the bore 27 thereof, rotation of the bolt 32, such as by means of a suitable wrench (not shown) being applied to the head 33 of the bolt 32, will move the conical wedge 48 upwardly into the conical bore 46 of the spreader nut 36. Such upward movement of the conical wedge 48 will radially spread the arms 40 into frictional gripping engagement with the inner surface of the sign post 20.

A pair of arcuate key-hole shaped openings 56 are formed through the top wall 22 of the post cap 12 on diametrically opposed sides of the centrally located counterbore 30 thereof. Each of the openings 56 is provided with a large, i.e. wide, end portion 58 and a relatively narrower end portion 60. Also, two groups, or clusters, of upstanding saw-tooth ridges 62 are formed on the top wall 22 of the post cap 12, with the clusters being on diametrically opposed sides of the counterbore 30. As will hereinafter be described in detail, the key-hole openings 56 and the upstanding saw-tooth ridges 62 form part of a means for mounting the lower, or first, street sign 14 on the post cap 12, and for preventing subsequent removal.

Figure 6:
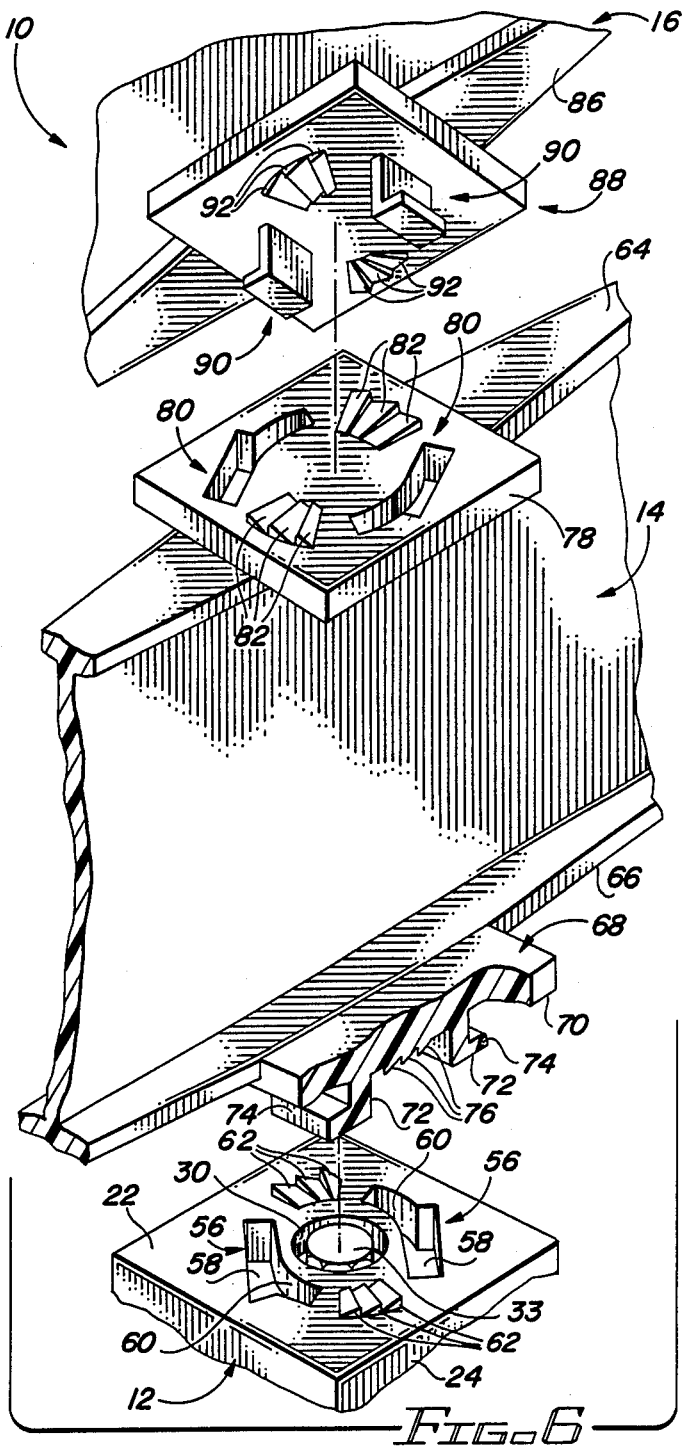
FIG. 6 is a fragmentary exploded perspective view showing the special configuration of the post cap and street signs which allows the assembly to be made without visibly apparent assembly means and mounting fasteners.
Figure 7:
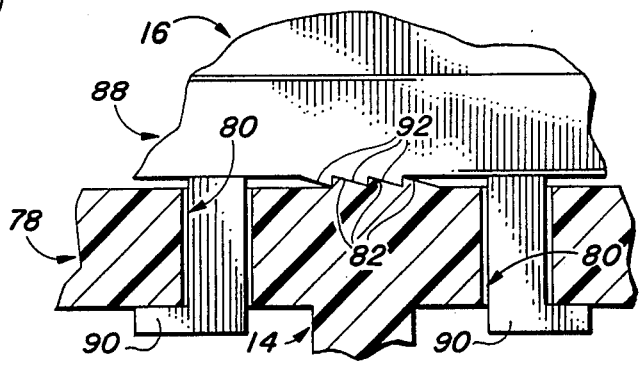
FIG. 7 is an enlarged fragmentary sectional view taken along the line 7—7 of FIG. 1.

The first street sign 14 is an elongated planar structure upon which street identification indicia (not shown) is displayed in the usual manner, such as by a silk screening process or any other well known technique. The street sign 14 has upper and lower longitudinal edges 64 and 66 respectively, with a lower mounting pad 68 being formed on the lower longitudinal edge 66 intermediate the opposite ends. The downwardly facing surface 70 of the lower mounting pad 68, as best seen in FIG. 6, is provided with a pair of L-shaped hooks 72 which depend integrally from the lower mounting pad 68. The L-shaped hooks 72 each have a foot 74 extending normally from the lower end thereof, and the hooks 72 are spaced apart a distance which is equal to the spacing between the key-hole shaped openings 56 of the post cap 12. Also, two groups, or clusters (one shown) of saw-tooth ridges 76 depend from the lower surface 70 of the mounting pad 68, with those two clusters of ridges 76 being disposed to mattingly align with the upstanding ridges 62 of the post cap 12.

Mounting of the first street identification sign 14 on the post cap 12 is accomplished by passing feet 74 of the hooks 72 downwardly through the wider end portions 58 of the key-hole shaped openings 56 provided in the top wall 22 of the post cap 12. Subsequent rotation of the first street sign 14 is then accomplished to move the L-shaped hooks 72 into the narrower ends 60 of the key-hole shaped openings 58. This results in the feet 74 of the hooks 72 being moved into hooked under engagement with the top wall 22 of the post cap 12 to prevent axial separation of the street sign 14 and the post cap 12.

Once the lower street sign 14 is mounted on the post cap 12 in the manner described above, disassembly is prevented by interaction of the upstanding saw-tooth ridges 62 of the post cap 12 and the depending saw-tooth ridges 76 of the lower mounting pad 68. The saw-tooth ridges 62 and 76 act like a ratchet-pawl mechanism which allows the street sign 14 to be rotated in one direction, i.e. the one required to mount the sign 14 on the post cap 12, and prevents it from being rotated in the reverse direction. Also, when the lower street sign 14 is mounted on the post cap 12, the mounting pad 68 of the sign 14 covers the counterbore 30 formed in the top wall 22 of the post cap 12. This, of course, hides the head 33 of the bolt 32 from view and blocks access to the bolt which prevents, or at least makes it very difficult to remove the street sign assembly 10 from the sign post 20.

The key-hole shaped openings 56 formed in the post cap 12 and the depending L-shaped hooks of the first street sign 14 provide what may be defined as cooperating elements of an interconnection means, and the saw-tooth ridges 62 and 76 provide what may be defined as cooperating elements of a jam means for preventing the subsequent separation of the interconnected first street sign 14 and the post cap 12.

As shown best in FIG. 6, the first street sign 14 also includes an upper mounting pad 78 which is integrally formed on the upper longitudinal edge 64 intermediate the opposite ends of the street sign 14. The upper mounting pad 78 includes a pair of arcuate key-hole shaped openings 80 and two groups of upstanding saw-tooth ridges 82 which are arranged on the upper mounting pad 78 in the same manner as the openings 56 and the ridges 62 of the top wall 22 of the post cap 12.

The second, or upper, street identification sign 16, like the first street sign 14, is of elongated planar configuration for displaying street identification indicia, and has upper and lower longitudinal edges 84 and 86. A mounting pad 88 is integrally formed on the second street sign 16 proximate the lower longitudinal edge 86 and intermediate the opposite ends of the street sign 16. The mounting pad 88 is provided with a pair of L-shaped hooks 90 which depend from its downwardly facing surface and with two groups, or clusters of saw-tooth ridges 92. The hooks 90 and the ridges 92 are arranged on the mounting pad 88 in the same way as the hereinbefore described hooks 72 and the ridges 76 of the mounting pad 68 of the first street sign 14. Therefore, the upper street sign 16 is mounted in a cruciform attitude on top of the lower street sign 14 in the same manner that the lower street sign 14 is mounted on top of the post cap 12.

As was the case with mounting of the first street sign 14 on the post cap 12, the depending L-shaped hooks 90 provided on the pad 88 of the second street sign 16 and the key-hole shaped apertures 80 of the top mounting pad 78 of the first street sign 14 provide what may be defined as cooperating elements of an interconnection means. Further, the saw-tooth ridges 82 and 92 provided on the mounting pads 78 and 88 form what may be defined as cooperating elements of a jam means for preventing or inhibiting, the subsequent separation of the interconnected first and second street signs 14 and 16.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles.

For example, instead of the above described key-hole shaped apertures and hooks which are mounted therein by a rotating movement, deflectable hooks could be forced straight into rectangular openings so that subsequent disassembly could not be accomplished without destroying the street sign assembly.

The appended claims are therefore intended to cover and embrace any such modifications within the limits only of the true spirit and scope of the invention.

What I claim is:

1. A street identification sign assembly of the type mountable on the top of a vertical tubular sign post, said street sign assembly comprising in combination:
   (a) a post cap for mounting on the top of the sign post, said post cap including a top wall and a downwardly opening blind bore for axially receiving the top end of the sign post;
   (b) an expandable locking means mounted in said blind bore for engaging the bore of the sign post and including means for expanding said expandable locking means into frictional gripping engagement with the bore of the sign post to lockingly attach said post cap;
   (c) an elongated street sign for displaying street identification indicia, said street sign including upper and lower longitudinal edges and a lower mounting pad proximate said lower longitudinal edge;
   (d) interconnection means disposed on said top wall and on said lower mounting pad for mounting said street sign on said post cap, said interconnection means including jam means disposed on said top wall and on said mounting pad for inhibiting disassembly of said street sign from said post cap;
   (e) said top wall including a spaced apart pair of arcuate openings formed on diametrically opposed sides of the center of said top wall each of said openings being of key-hole shape with a relatively wide end and an opposite relatively narrow end; and
   (f) a pair of hooks depending from said mounting pad, said pair of hooks being aligned with said openings and freely passable through the relatively wide ends thereof and being in hooked engagement with said wall when said first street sign is rotated relatively to said post cap to move said hooks from the wide ends of said openings into the narrow ends thereof.

2. A street identification sign assembly as claimed in claim 1 and further comprising:
   (a) said top wall including a central opening formed therethrough; and
   (b) said expanding means being mounted in said central opening and including means for operating said expanding means from above said post cap.

3. A street identification sign assembly as claimed in claim 2 wherein said expandable locking means comprises:
   (a) fastener means rotatably disposed in said central opening and including a head and a threaded shank depending axially into said blind bore;
   (b) a spreader nut carried loosely on said threaded shank for free axial movement therealong, said spreader nut having a plurality of arms independently movable from radially retracted normal positions to radially extended positions; and (c) wedge means threadingly carried on said threaded shank for moving into and out of engagement with said spreader nut upon rotation of said fastener means to move said plurality of arms into radially extended positions when said wedge is moved into engagement with said spreader nut.

4. A street identification sign assembly as claimed in claim 3 and further comprising:
   (a) said top wall having a counterbore formed in the upper surface thereof and coaxial with said central opening formed therein; and
   (b) said head being disposed in said counterbore.

5. A street identification sign assembly as claimed in claim 3 and further comprising:
   (a) said spreader nut including a boss having an axial bore formed therethrough for freely receiving the threaded shank of said fastener means;
   (b) each arm of said plurality of arms extending integrally and outwardly from the lower end of said boss in different radial directions;
   (c) said plurality of arms cooperatively defining a downwardly opening conical bore at the depending end of said spreader nut; and
   (d) said wedge means being of conical configuration to radially spread said plurality of arms upon movement of said spreader nut into the conical bore.

6. A street identification sign assembly as claimed in claim 1 wherein said interconnection means comprises:
   (a) said top wall including a spaced apart pair of openings; and
   (b) hook means depending from said mounting pad and passing through said openings for engaging in hooked attachment said top wall.

7. A street identification sign assembly as claimed in claim 1 including a jam means comprising:
   (a) at least one upstanding saw-tooth ridge formed on said top wall;
   (b) at least one depending saw-tooth ridge formed on said mounting pad; and
   (c) said upstanding saw-tooth ridge and said depending saw-tooth ridge being matingly aligned with each other and facing in opposite directions to allow rotation of said street sign in one direction relative to said post cap and to prevent rotation in the opposite direction.

8. A street identification sign assembly as claimed in claim 1 and further comprising:
   (a) an upper mounting pad disposed proximate the upper longitudinal edge of said street sign;
   (b) a further elongated street sign for displaying street identifying indicia, said further street sign having a lower longitudinal edge and a further mounting pad proximate the lower longitudinal edge; and
   (c) further interconnection means disposed on said upper mounting pad and on said further mounting pad for mounting said further street sign in a cruciform attitude on top of said street sign.

9. A street identification sign assembly as claimed in claim 8 and including further jam means disposed on said upper mounting pad and on said further mounting pad for inhibiting disassembly of said street sign and said further street sign.

10. A street identification sign assembly as claimed in claim 8 including:
    (a) a spaced apart pair of openings disposed in said upper mounting pad; and
    (b) hook means depending from said further mounting pad and passing through said openings for attaching said upper mounting pad.

11. A street identification sign assembly as claimed in claim 8 including:
    (a) a spaced apart pair of arcuate openings formed on diametrically opposed sides of the center of said upper mounting pad, said openings being of keyhole shape and having a relatively wide end and an opposite relatively narrow end; and
    (b) a pair of hooks depending from said further mounting pad, said pair of hooks being aligned with said openings and freely passable through the relatively wide ends, said pair of hooks being engageable with said upper mounting pad upon rotation of said further street sign to move said pair of hooks from the wide ends of said openings and into the narrow ends.

12. A street identification sign assembly as claimed in claim 11 including jam means comprising:
    (a) at least one upstanding saw-tooth ridge formed on said upper mounting pad;
    (b) at least one depending saw-tooth ridge formed on said further mounting pad; and
    (c) said upstanding saw-tooth ridge and said depending saw-tooth ridge being matingly aligned with each other and facing in opposite directions to allow rotation of said further street sign in one direction relative to said street sign and prevent rotation in the opposite direction.

* * * * *